Feb. 21, 1933.  D. A. DORSEY  1,898,430
AEROPLANE
Filed July 30, 1932    2 Sheets-Sheet 1
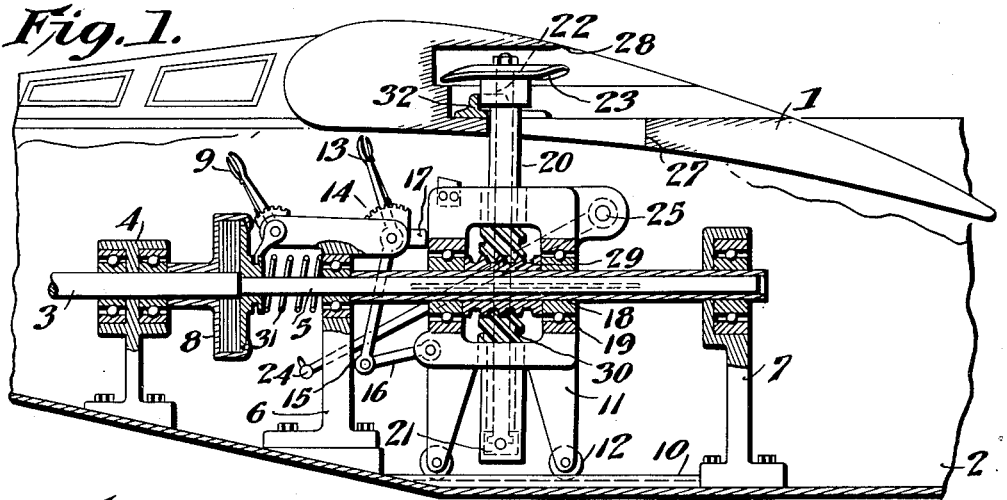
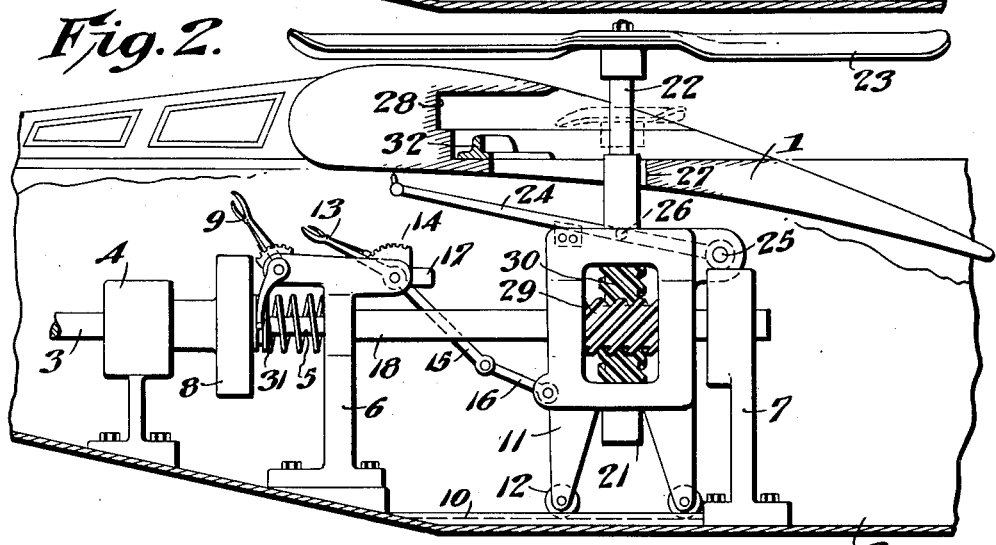
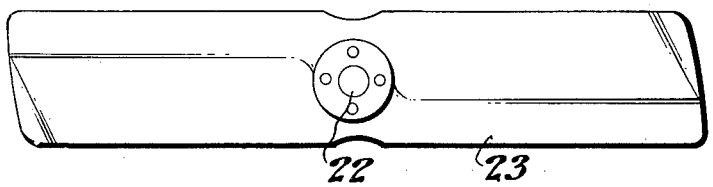
Inventor
Dana A. Dorsey
By Lloyd W. Patch
Attorney

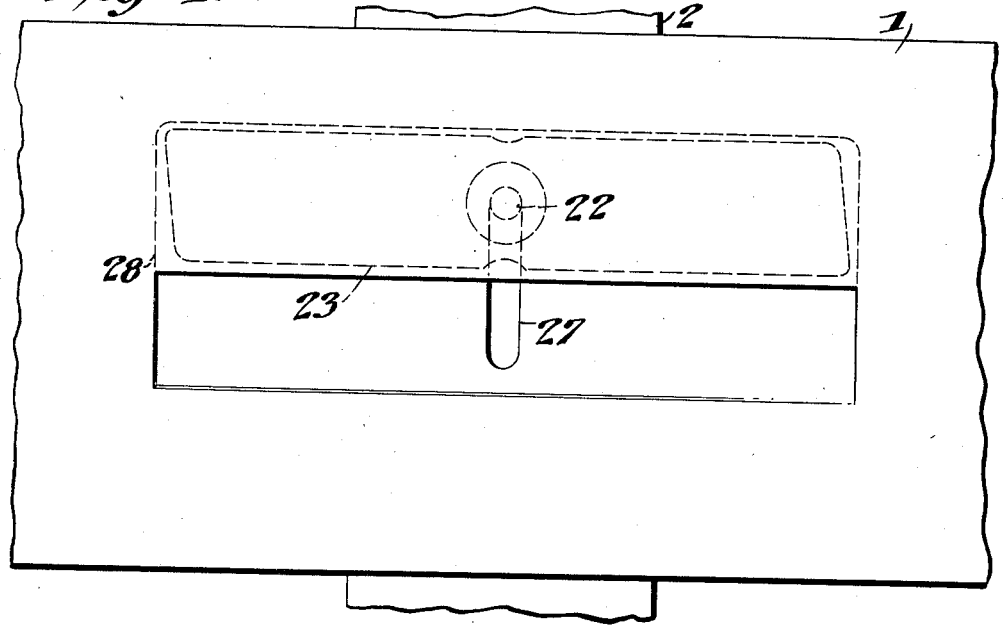

Patented Feb. 21, 1933

1,898,430

UNITED STATES PATENT OFFICE

DANA ALBERT DORSEY, OF MIAMI, FLORIDA

AEROPLANE

Application filed July 30, 1932. Serial No. 626,923.

My invention relates to improvements in aeroplanes and particularly to a structure of this character intended and adapted for use as a land or an amphibian plane.

An object is to provide an aeroplane in which the plane wing is of substantially usual and standard construction and design, and yet a helicopter or self-rotating propeller structure is included as an auxiliary elevating and load sustaining means.

Another object is to so construct and mount the parts that the auxiliary helicopter or propeller structure can be extended for use as desired and can be retracted, when not in use, to fit within and conform to the general and standard lines of the aeroplane.

With the above and other objects in view, which will be apparent to those skilled in the art, this invention includes certain novel features of construction and combinations of parts which will be hereinafter set forth in connection with the drawings and then pointed out in the claims.

In the drawings:

Figure 1 is a fragmentary view in section through an aeroplane structure showing my invention applied thereto.

Fig. 2 is a view similar to Figure 1 showing parts in the extended position for use.

Fig. 3 is a top plan view of the helicopter or propeller structure.

Fig. 4 is a fragmentary top plan view to better show the relative mounting of the propeller or helicopter structure.

In the present instance I have illustrated my invention as applied to and used in connection with an aeroplane structure of the monoplane type, although it is to be understood that the invention is adaptable for use on substantially any and all standard or usual types of aeroplane structure.

The wing 1 is of substantially usual form and construction, and can be placed and mounted in the usual manner with respect to the fuselage 2. A shaft 3 extends from the engine or power unit through bearings 5 to dispose its end adjacent to the forward edge of the wing 1, and a shaft 5 is mounted in line with the drive shaft 3. in bearings 6 and 7. A clutch 8 is provided, to be controlled by clutch lever 9, so that the shaft 5 can be connected to be rotated by the drive shaft 3, and can be disconnected to be free therefrom.

A track 10 is provided between the bearing standards 6 and 7 and a carriage 11 is supported by wheels 12 mounted on track 10, so that the carriage can be moved longitudinally between the bearing standards 6 and 7. A hand lever 13 pivotally connected on bearing standard 6, and having a detent working against rack 14, has an arm 15 depending below its pivotal mounting, a link 16 is connected pivotally with the swinging end of arm 15 and has swinging mounting on the carriage 11. By manipulation of hand lever 13, the carriage 11 can be shifted and moved upon the wheels 12 and tracks 10, to each of the extreme positions illustrated in Figs. 1 and 2, stops 17 being preferably provided to limit movement.

A sleeve 18, slidably keyed or splined on shaft 5 is revoluble in bearings 19 in the carriage 11, and a sleeve 20 is slidably mounted in substantially vertical disposition in the carriage 11 at one side of the mounting of the sleeve 18. This sliding sleeve 20 has a thrust bearing 21 at its lower end, and a shaft 22 is revolubly mounted in the sliding sleeve 20 and is associated with the thrust bearing 21. At its upper end, this shaft 22 mounts an auxiliary elevating or helicopter propeller 23.

An elevating lever 24 is given swinging mounting at one end, at 25, on the carriage 11, and a pin 26 connects this elevating lever with the sliding sleeve 20. When this elevating lever 24 is in the position illustrated in Figure 1, the sliding sleeve 20 is lowered, and when the lever 24 is swung up, as shown in Fig. 2, the sliding sleeve 20 is elevated to extend the shaft 22, and the auxiliary propeller or helicopter structure 23, above the top surface of the plane wing 1.

A suitable slot or opening 27 is provided through the plane wing to permit the forward and back movement of the sliding sleeve 20 and shaft 22, as the carriage 11 is moved, and when the sliding sleeve 20 is lowered, the shaft 22 is of such length that the auxiliary propeller or helicopter structure 23 will be substantially in the middle, from top to bottom, of the plane wing structure 1.

It is a primary purpose of my invention to provide a housing for the auxiliary propeller or helicopter, when not in use, so that this structure will not offer wind resistance or other obstacle to the full and normal operation and speed of the aeroplane, and with this in mind I provide a recess 28 within the plane wing, opening rearwardly and substantially centered behind the leading edge of the plane wing. This recess 28 is so formed that it will completely take and house the auxiliary propeller 23 when lowered to the position illustrated by the dotted lines in Fig. 2, and then moved forward, by the carriage 11, to the position shown in Figure 1. As the recess 28 is formed mainly within the body of the wing structure and has the opening therefrom rearwardly, this will not materially alter or affect the action of sustaining air forces, or the normal operation of the aeroplane. When the parts are in the retracted relation, as illustrated in Figure 1, the propeller 23 has its length parallel with the longitudinal extent of the plane wing 1, as illustrated in Fig. 4, and the aeroplane can be operated and maneuvered in the usual manner and with the usual efficiency and speed. Clutch 8 is released, and there is no strain or other effect or load upon the drive shaft 3. When it is desired to use the helicopter or propeller portion 23, the lever 13 is manipulated to move the carriage 11 to the position illustrated in Fig. 2, and elevating lever 24 is moved, as shown, to raise the propeller 23 from the position shown in dotted lines, to the position illustrated in full lines, where the propeller is clear to rotate above the top surface of the plane wing 1. Meshing gears 29 and 30, on sleeve 18 and shaft 22 respectively, connect the shaft 22 to be rotated with shaft 5, and as the clutch 8 is thrown in the propeller 23 will be rotated upon a substantially vertical axis, to apply lifting force to the plane structure. The usual clutch spring 31 can be provided, and in other ways the parts can be made to be of substantially standard construction. Should it be desired to release the propeller 23 for self-rotation, this is readily accomplished by manipulation of the clutch.

When the propeller 23 is not desired for use, lever 24 is swung down to lower the propeller to the dotted line position in Fig. 2, and hand lever 13 is then manipulated to move carriage 11 forwardly to the position shown in Figure 1, where the propeller is retracted into the recess 28 of the wing. A rest 32 can be provided to receive and support the propeller 23, when not in use, and the detent of lever 13 will serve to retain the propeller therein.

While I have herein shown and described only certain specific embodiments of my invention and have set forth only certain possible modifications and changes, it is to be appreciated that many changes in form, construction, arrangement, mounting, and assembly of the parts, and in the manner of controlling and using the same, can be made without departing from the spirit and scope of my invention.

I claim:

1. With an aeroplane having usual wing structure, a recess in said wing having a covering conforming substantially to usual surfaces of the wing, and a propeller mounted to turn on a substantially vertical axis and movable to be retracted into the recess when not in use.

2. With an aeroplane having usual wing structure, a recess in said wing opening toward the trailing edge, and a propeller mounted to turn on a substantially vertical axis and bodily movable substantially horizontally to be withdrawn into the recess when not in use.

3. With an aeroplane having usual wing structure, a recess in said wing opening rearwardly, a propeller mounted to turn on a substantially vertical axis and movable to be retracted into the recess when not in use, said propeller being movable from the recess for use, and means to elevate said propeller to a position for rotation above the plane wing when withdrawn from the recess.

4. With an aeroplane having usual wing structure, a recess in said wing opening rearwardly and having a covering over the top to substantially conform to the usual surface contour of the wing, a propeller mounted to turn on a subtsantially vertical axis, and means to move the propeller substantially horizontally to fit within the recess when not in use.

5. With an aeroplane having usual wing structure, a recess in said wing opening rearwardly and having a covering over the top to substantially conform to the usual surface contour of the wing, a propeller mounted to turn on a substantially vertical axis, means to move the propeller substantially horizontally to fit within the recess when not in use, and means to raise the propeller when withdrawn from the recess to elevate said propeller to rotate above the plane wing.

6. With an aeroplane having substantially usual wing and fuselage structure, a recess in the wing opening rearwardly, a supporting carriage mounted for movement forward and back in the fuselage, a propeller mounted upon said carriage to turn on a substantially vertical axis, and means to move said carriage to retract said propeller into the recess and to move the propeller from the recess.

7. With an aeroplane having substantially usual wing and fuselage structure, a recess in the wing opening rearwardly, a supporting carriage mounted for movement forward and back in the fuselage, a propeller mounted upon said carriage to turn on a substantially vertical axis, means to move said carriage to retract said propeller into the recess and to move the propeller from the recess, and means to elevate said propeller when withdrawn from the recess to rotate above the plane wing.

In testimony whereof I hereunto affix my signature.

DANA ALBERT DORSEY.